US009888342B2

(12) United States Patent
Cariss et al.

(10) Patent No.: US 9,888,342 B2
(45) Date of Patent: Feb. 6, 2018

(54) COMMUNICATION METHOD AND SYSTEM

(71) Applicant: BLUE SYNC LIMITED, Wandsworth (GB)

(72) Inventors: Benjamin Joseph Cariss, Wandsworth (GB); John Stuart Cariss, Wandsworth (GB)

(73) Assignee: BLUE SYNC LIMITED, Wandsworth (GB)

( * ) Notice: Subject to any disclaimer, the term of this patent is extended or adjusted under 35 U.S.C. 154(b) by 0 days.

(21) Appl. No.: 15/024,612

(22) PCT Filed: Sep. 26, 2014

(86) PCT No.: PCT/GB2014/052925
§ 371 (c)(1),
(2) Date: Mar. 24, 2016

(87) PCT Pub. No.: WO2015/044677
PCT Pub. Date: Apr. 2, 2015

(65) Prior Publication Data
US 2016/0295358 A1    Oct. 6, 2016

(30) Foreign Application Priority Data

Sep. 27, 2013 (GB) .................................. 1317211.9
Jan. 24, 2014 (GB) .................................. 1401251.2

(51) Int. Cl.
*H04W 24/00* (2009.01)
*H04W 4/02* (2009.01)
(Continued)

(52) U.S. Cl.
CPC ............. *H04W 4/02* (2013.01); *H04W 4/008* (2013.01); *H04W 4/04* (2013.01)

(58) Field of Classification Search
CPC .......... H04W 4/008; H04W 4/04; G01S 11/02
(Continued)

(56) References Cited

U.S. PATENT DOCUMENTS 8,228,196 B1    7/2012 Thornton
2004/0087273 A1    5/2004 Perttila et al.
(Continued)

FOREIGN PATENT DOCUMENTS

EP    2704068 A1    3/2014
WO    2005062222 A1    7/2005
(Continued)

OTHER PUBLICATIONS

Dmitry Namiot et al: "About Location-aware Mobile Messages: Expert System Based on WiFi Spots", Next Generation Mobile Applications, Services and Technologies (NGMAST), 2011 5th International Conference on, IEEE, Sep. 14, 2011 (Sep. 14, 2011), pp. 48-53.
(Continued)

*Primary Examiner* — Kiet Doan
(74) *Attorney, Agent, or Firm* — Innovation Capital Law Group, LLP; Vic Lin

(57) ABSTRACT

The present invention relates to methods and systems for providing context-sensitive information to a mobile device, particular location-based information or the like. Specifically, the present invention relates to a distributed system that can use existing devices to send and receive context-sensitive information. In particular, the present invention relates to a method and system of providing context-sensitive information to a user of a mobile device comprising: transmitting from a tag attached to a moveable object via a wireless protocol a unique identifier to a mobile device; determining a measure of location of the mobile device and/or tag; and providing from a server information for display on the mobile device based on both the unique identifier and the measure of location.

16 Claims, 11 Drawing Sheets

Figure 1:
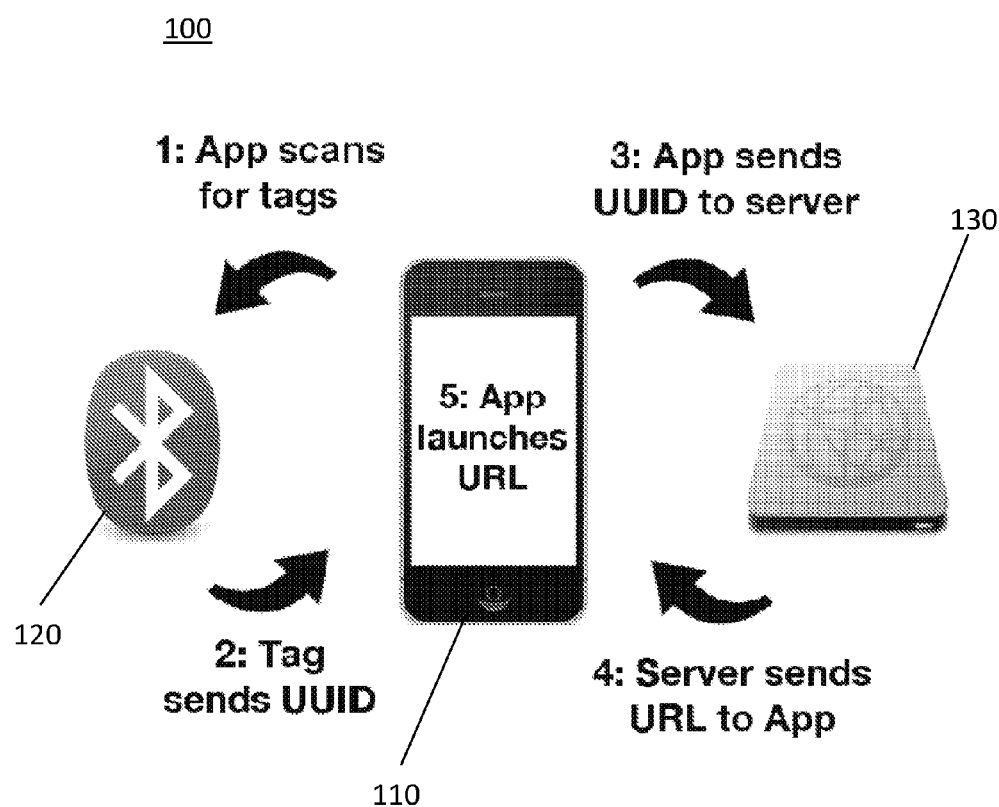

(51) Int. Cl.
*H04W 4/00* (2009.01)
*H04W 4/04* (2009.01)

(58) Field of Classification Search
USPC ............ 455/456.4, 418, 414.3, 456.2, 456.1;
342/465; 370/338; 340/10.1, 539.13,
340/552, 572.1
See application file for complete search history.

(56) References Cited

U.S. PATENT DOCUMENTS

| | | | |
|---|---|---|---|
| 2005/0239448 A1* | 10/2005 | Bayne | G06Q 30/02 455/414.3 |
| 2008/0042840 A1 | 2/2008 | Christopher | |
| 2010/0061294 A1 | 3/2010 | Proctor et al. | |
| 2013/0045686 A1 | 2/2013 | Kang et al. | |

FOREIGN PATENT DOCUMENTS

| | | |
|---|---|---|
| WO | 2009069982 A2 | 6/2009 |
| WO | 2013025770 A1 | 2/2013 |

OTHER PUBLICATIONS

International Search Report and Written Opinion dated Jan. 5, 2015 from corresponding International PCT Application No. PCT/GB2014/052925, 10 pages.
Jason Wu et al: " S-SPAN: Secure smart posters in Android using NEC", World of Wireless, Mobile and Multimedia Networks (WOWMOM), 2012 IEEE International Symposium on a, IEEE, Jun. 25, 2012, (Jun. 25, 2012), pp. 1-3.
Search Report dated May 15, 2015 from corresponding United Kingdom Application No. GB1417098.9, 3 pages.
Search Report dated May 8, 2014 from corresponding United Kingdom Application No. GB1401251.2, 4 pages.

* cited by examiner

COMMUNICATION METHOD AND SYSTEM

The present invention relates to methods and systems for providing context-sensitive information to a mobile device, particular location-based information or the like. Specifically, the present invention relates to a distributed system that can use existing devices to send and receive context-sensitive information to devices in the proximity of transmitters of the system.

A number of techniques are known for providing context-sensitive information to a mobile device, particularly location-based or location-sensitive information (for example, information that is associated with a particular location and that is accessible to a mobile device in, or that has been in, the particular location). Such techniques have a wide variety of applications including navigation, advertising, and augmented reality. For example, it is known to provide location-sensitive marketing information to mobile devices at locations such as in shops, on public transport, when entering or passing a particular location.

Typically, the location of a mobile device is determined using GPS. For example, location-sensitive augmented reality techniques primarily use GPS to determine the location of a mobile device, and then communicate with a web server to obtain associated location-sensitive information such as augmented reality overlay information. However, GPS does not work inside or near large structures such as buildings, so that the locations at which location-sensitive information can be provided are thereby restricted. Equally, GPS hardware consumes a relatively large amount of power, which is generally undesirable for mobile devices having limited battery power. Also, GPS hardware can take some time to provide accurate location data, especially in areas with high-rise buildings, which can be frustrating for the user. This can result in the GPS hardware providing inaccurate initial location data, resulting in incorrect information being provided based on this inaccurate location. More accurate and faster location data can be determined using "assisted" GPS, which uses phone mast triangulation in addition to GPS to determine a location, but this still suffers from the above mentioned problems as in addition to the problems with GPS, mobile network coverage can be subject to a lack of service, inaccurate initial triangulation data or too few masts in range to enable triangulation.

It is also known to use short range wireless communications protocols, such as Bluetooth or Wi-Fi, to provide context-sensitive information to mobile devices. One example of such an arrangement involves placing a dedicated Bluetooth server in a desired location, and then connecting to and delivering context-sensitive information to nearby mobile devices via the Bluetooth wireless protocol. However, in order for context-sensitive information to be successfully received by the mobile device, the server and mobile device must complete several security and verification steps such as "pairing" or "handshaking", which is both power and time consuming. Furthermore, the Bluetooth protocol stack does not always successfully make a connection between a mobile device and the server, the connection may be unreliable or the mobile device and/or server may need resetting periodically to enable further connections. Such connection problems consume power attempting to make and/or retain the connections and the need to provide an adequate power source can furthermore restrict the locations at which context-sensitive information can be provided as the use of battery power when a server is unattended can result in a short active lifetime of the server, necessitate the use of multiple sets of batteries which results in increased hardware costs, or providing a device with reduced transmitter power to conserve battery power and thus limiting connection range.

The present invention seeks to provide systems and methods for providing context-sensitive information to a mobile device, such as location-based information, that are low-cost, low-power, easily reconfigurable, and simple to implement.

According to a first aspect of the present invention, there is provided a method of providing context-sensitive information to users of one or more respective recipient mobile devices comprising: transmitting from a tag attached to a moveable object or from a transmitting mobile device via a wireless protocol a unique identifier to the one or more recipient mobile devices; determining a measure of location of the respective recipient mobile device and/or tag or transmitting mobile device; and providing from a server information for display on the one or more recipient mobile devices based on both the unique identifier and the measure of location.

According to a second aspect of the present invention, there is provided a system for providing context-sensitive information to users of one or more respective recipient mobile devices comprising: a tag or a transmitting mobile device, the tag being attached to a moveable object, the tag or transmitting mobile device configured to transmit via a wireless protocol a unique identifier to the one or more recipient mobile devices; a location detector configured to determine a measure of location of the one or more recipient mobile devices and/or tag or transmitting mobile device upon receipt of the unique identifier by the one or more recipient mobile devices; and a server configured to provide information for display on the one or more recipient mobile devices based on both the unique identifier and the measure of location in response to a query from one or more recipient mobile devices.

The present invention provides a method and system in which a mobile device receives a unique identifier from a device transmitting or broadcasting using a wireless protocol in a conventional manner. However, rather than the mobile device then setting up a connection and obtaining further data from the device transmitting the unique identifier, via a connection established with it by the wireless protocol as would happen in prior systems, the mobile device is instead configured to display context-sensitive information obtained from a server, i.e. not the device transmitting the unique identifier. As will become more apparent from the following, this arrangement advantageously allows context-sensitive information, such as information specific to the location of the device transmitting the unique identifier, to be provided to mobile devices using a simplified device that only needs to transmit or broadcast a unique identifier. Devices in the proximity of a tag or a transmitting mobile device such as a tablet or mobile phone can receive broadcasts containing unique identifiers from the tag or transmitting mobile device.

This arrangement also, or alternatively, advantageously allows for the provision of context-sensitive information at locations where it would otherwise not be possible using prior systems due to power requirements and other restrictions such as a lack of location information. For example, it is not necessary for the device transmitting the unique identifier to have sufficient capability to transmit the context-sensitive information because the mobile device instead displays information obtained from a remote server, the information transfer optionally triggered simply by the mobile device using the unique identifier to display information obtained from the server.

A further or alternative advantage of the arrangement is that it facilitates straightforward relocation or reconfiguration of the location(s) at which context-sensitive information can be provided as the information associated with each unique identifier can be modified at the server.

The methods and systems of the present invention optionally allow the unique identifier to be provided to the recipient mobile device without requiring a full communications session to be established between the recipient mobile device and the device transmitting the wireless protocol, saving time and/or power and also preventing the mobile device needing user input or to send any verification or security data to the transmitting device. For example, the unique identifier can transmitted to the mobile device in an initial communication phase of a wireless protocol. Optionally this initial communication phase does not require any verification or security at the mobile device, for example requiring the user to enter a PIN, a password, biometric data (such as a fingerprint scan, facial recognition data, etc.) or any other security code or verification. By providing the unique identifier to the mobile device before any later stages of the communication protocol, which would normally require an input or pre-existing permission to confirm that communications between the devices should be allowed to proceed further, the tag minimises power use and can be a device of reduced complexity as these later communication phases are not required. In one embodiment, the mobile device receives the unique identifier from the initial stage of the wireless communication protocol. As will be understood by those having skill in the art, the initial stage of a wireless communication protocol generally comprises a wireless transmitter passively broadcasting its unique identifier (in a "discovery" mode), and a mobile device searching (scanning) for and identifying transmissions having compatible unique identifiers. Later stages of a wireless communication protocol (which are intended to be excluded by the phrase "initial stage of a wireless protocol") include the transmitter and mobile device carrying out steps of "pairing" or "handshaking", security or verification steps, and the actual transfer of payload data between the transmitter and the mobile device. In the present application, the initial stages of a wireless communications protocol are those stages prior to two-way communication being fully established between two devices according to the normal use of the wireless protocol. In an embodiment, the mobile device does not interact with or use the wireless protocol beyond receiving the unique identifier from the initial stage of the wireless protocol. Thus, in this embodiment the mobile device does not pair or handshake with the wireless protocol or transmitter, and does not receive any payload data over the wireless protocol. Correspondingly, in embodiments the short-range wireless transmitter is configured only to run the initial stage of the wireless protocol. Thus, the short-range wireless transmitter may be configured only to transmit the unique identifier, i.e. (only) to passively broadcast the unique identifier, and not to pair or handshake with the mobile device, nor to transmit or broadcast any payload data. In an embodiment the system and method of the present invention does not require pairing or handshaking between the mobile device and the wireless transmitter. This is particularly advantageous when multiple mobile devices are present in the system because the wireless transmitter can avoid having to pair with or connect to each and every mobile device that it encounters, and can thereby reduce its computational burden and consequentially its power usage.

Indeed, as discussed above, the transmitter can be provided as a low-complexity, low-power passive broadcasting device.

The context-sensitive information can be any desired information that is associated with a particular location where the transmitting device is located or may be any other information relevant to the mobile device receiving the initial phase transmission from the transmitting device. The information is accessible by a mobile device that is present in, or that has been present in, the particular location of the tag because the tag has a limited range and only mobile devices within this range will be able to receive the unique identifier transmitted by the tag.

The unique identifier can be any suitable code that can be used as a unique (or practically unique) code, and that can have context-sensitive information associated with it. In embodiments, the unique identifier comprises a Universally Unique Identifier (UUID) or a MAC address. However by unique identifier, it is to be understood that the identifier may not be truly unique and in some cases the identifier could, for example, be cloned. In alternative embodiments, the identifier may be unique in the respect that a protocol identifier (that may not be unique) is made likely to be unique by hashing the identifier.

The methods and systems of the present invention can be implemented with one or more low-cost and/or low-power devices each transmitting unique identifiers and implemented using existing mobile device and server hardware.

The server can be any suitable server, optionally one that is remote from the location associated with the context-sensitive information (i.e. remote from and separate to the wireless transmitter), and one that is capable of storing the context-sensitive information and providing it to the mobile device. For example the server can be a web server hosted remotely, i.e. remote from both the location associated with the context-sensitive information and the mobile device. Optionally, the step of obtaining the context-sensitive information from the remote server comprises the mobile device obtaining the information from a remote server using a second, different wireless protocol, such as WAP, GSM, 3G, and the like. Mobile devices are commonly equipped with one or more of these wireless protocols and are enabled for ad hoc data connections to remote servers, enabling the mobile device to fetch the context-sensitive information when triggered through receiving a unique identifier. The above method may be implemented using an existing mobile device, for example by installing software or an application on the mobile device. The mobile device can be any suitable device that can be conveniently transported to different locations, and that is capable of receiving the unique identifier of the wireless protocol and obtaining the associated context-sensitive information from a remote server. In various embodiments, the mobile device comprises any of a mobile computer, mobile phone, smartphone, tablet computer, or the like. The mobile device may be equipped with suitable wireless capabilities for receiving the unique identifier such as Bluetooth and/or Wi-Fi capabilities, etc.

Optionally, the moveable object or transmitting mobile device may be provided with a display and the unique identifier is associated with information shown on the display.

The transmitter may be positioned in any location where it is desired to provide context-sensitive information and can be co-located with or integrated into a display: for example a conventional static sign, billboard or poster. For example the transmitter may be located at a shop or nearby, within or on an associated object such as a sign, billboard, poster, barcode, etc., and the context-sensitive information may be directly related to the shop and/or to the object. The context-sensitive information for these examples might then comprise further information about the advert displayed on the shop or about the shop, for instance a link to a relevant website. Alternatively, some form of promotion material can be provided to the user of the mobile device, for instance a discount voucher relevant to the advert or shop on which the transmitter is located. In an embodiment, the transmitter is positioned in a location or in conjunction with an object that will indicate that the context-sensitive information is available at and/or in respect of that location or object. The transmitter may be positioned at a single location or in conjunction with an associated stationary object, such as a conventional sign, billboard or poster, or it may be positioned in a moving location such as in a vehicle, or in conjunction with an associated movable object, such as a sign, billboard or a poster mounted on a vehicle. Alternatively, if the transmitter is a mobile device such as a mobile phone, an app might display relevant information on the screen related to the unique identifier being transmitted to other devices.

Optionally, the display may be configured to change the information shown periodically and/or based on the location of the moveable object or transmitting mobile device, and the information for display on the recipient mobile device may be selected to correspond to the information shown on the display on the moveable object or transmitting mobile device.

Where the transmitter is located in conjunction with a sign, billboard, poster, or the like, the sign, billboard or poster may be a conventional static sign, billboard or poster that is changed manually, or may be a dynamic sign, billboard or poster that can change what is displayed. As such, the display may be changed when it is desired that a different display is shown. When dynamic, the display may be automatically changed, for example between different predetermined static or video advertisements. The display may be automatically changed at any desired points in time, for example periodically, or at different times of day, or upon receiving a trigger. This then means that the display can be tailored as appropriate, for example, to the time an advert is being shown. In embodiments where the transmitter is located in conjunction with a sign, billboard, poster, or the like, the sign, billboard or poster may be a conventional static sign, billboard or poster, or may be a dynamic sign, billboard or poster that can change its display. In this latter embodiment, the display may be manually changed when it is desired that a different display is shown. Additionally or alternatively, the display may be automatically changed, for example between different predetermined or dynamic displays. The display may be automatically changed at any desired points in time, for example periodically, or at different times of day, or upon receiving a trigger. This then means that the display can be tailored to be appropriate to the time at which it is shown. In an embodiment, the server may cause the dynamic display to change in response to receiving the unique identifier. Thus, in this embodiment context-sensitive information may be displayed on the dynamic display. In an embodiment, where the transmitter is located in conjunction with a dynamic sign, billboard, poster, or the like (that changes its display), the mobile device can receive different sets of context-sensitive information, where at least some of the sets are related to the different displays. In an embodiment, a related set of context-sensitive information is provided for each of the different displays. According to this embodiment, the system may be configured so as to allow a user to select between the different sets of context-sensitive information as desired. For example, in embodiments where the display automatically changes relatively quickly in a periodic manner (for example, a conventional dynamic billboard that cycles through a number of different displays periodically), the system may be configured so that a user can select which set of context-sensitive information is required from the multiple available sets of context-sensitive information corresponding to the multiple displays. Alternatively, in embodiments where the transmitter is located in conjunction with a dynamic display, the context-sensitive information that can be received by the mobile device changes in a synchronised manner with the changes in the display of the dynamic display. This then avoids the need to require a user to make a selection regarding which set of context-sensitive information is desired. This may be particularly useful in situations where requiring a user to make a selection is undesirable or impractical, for example where the dynamic display changes over a relatively longer period of time. In an embodiment the changes in the context-sensitive information and the dynamic display are synchronised by changing the context-sensitive information and the dynamic display at predetermined corresponding times. Additionally or alternatively, the context-sensitive information and the dynamic display may be synchronised by triggering the context-sensitive information and the dynamic display to change at the same time. This then means that a user will automatically receive the correct context-sensitive information that is relevant to the current display on the dynamic display. In alternative embodiments, the context-sensitive information need not be synchronised with the changing dynamic display in this manner. For example, the dynamic display may be configured to change automatically or upon triggering as above, while the remote server may be configured to have knowledge of which display is currently being displayed. In these embodiments, when a user attempts to obtain the context-sensitive information associated with the current display of the dynamic display, the server can use that knowledge to then return the appropriate context-sensitive information to the mobile device. As discussed above, the context-sensitive information delivered to the mobile device and/or the display of the associated dynamic sign, billboard or poster can change with time. In embodiments where the transmitter is located on a movable object, such as a vehicle, the context-sensitive information and/or the display of the associated dynamic sign, billboard or poster, can additionally or alternatively be configured to change based on the position of the transmitter and/or of the mobile device. This then means that the context-sensitive information and/or the display of the associated dynamic sign, billboard or poster can be tailored to be appropriate to the position at which it is provided.

In an embodiment, the server may cause the dynamic display to change in response to receiving the unique identifier. Thus, in this embodiment context-sensitive information may be displayed on the dynamic display.

Optionally, the information for display on the mobile device may be provided from the server to the recipient mobile device in advance of the recipient mobile device receiving one or more unique identifiers from one or more respective tags or transmitting mobile device(s), and the information for display may be stored on the recipient mobile device for retrieval.

By storing some or all of the context-sensitive information and some or all of the corresponding unique identifiers, when the communication between the recipient mobile device and the server is interrupted, the information can still be displayed on the recipient mobile device when a unique identifier is received by the recipient mobile device where the relevant information is stored on the recipient mobile device for received unique identifiers. In embodiments, the step of determining the context-sensitive information associated with the unique identifier comprises consulting a database or databases to identify the context-sensitive information associated with the unique identifier. The database(s) may contain entries for each unique identifier. The database(s) may comprise, for example, a MySQL database(s). The database(s) can be located on the mobile device itself, on or a remote server, or may be distributed between a remote server(s) and the mobile device. In embodiments where the database is located on the mobile device, the step of determining the context-sensitive information associated with the unique identifier may further comprise the recipient mobile device consulting a locally stored database. In these embodiments, the database may comprise remote addresses, such as URL addresses, from which the context-sensitive information associated with each unique identifier may be obtained by the mobile device. Accordingly, in these embodiments, the method may further comprise the mobile device obtaining the context-sensitive information using the remote address associated with the unique identifier. Thus, it will be appreciated that in these embodiments, the remote address is optionally the address of a web server. In an embodiment where the information is not cached on the mobile device, the mobile device obtains the context-sensitive information as soon as possible after receiving the unique identifier. However, in another embodiment, the unique identifier and/or remote address associated with the unique identifier may be stored on the recipient mobile device, and the mobile device may then obtain the context-sensitive information at a later time. This may be particularly useful where information is not available when the unique identifier is received, such as where the remote server is a web server and the recipient mobile device cannot access the internet or where the information is not cached on the mobile device. In embodiments of the present invention, the context-sensitive information may be stored or cached on the recipient mobile device. Thus, for example, the step of displaying the context-sensitive information on the mobile device may occur at any time after the step of providing the context-sensitive information to the mobile device. Indeed, the context-sensitive may be obtained from, for example, a database on the mobile device which may have been preloaded onto the mobile device, for example in the form of a local application comprising a database of context-sensitive information. That is, one or more of the information for display on the mobile device may be provided from the server to the mobile device in advance of the mobile device receiving one or more unique identifiers from one or more respective transmitters/tags, and the information for display may be stored on the mobile device for retrieval, for example when the communication between the mobile device and the server is interrupted. Alternatively, the recipient mobile device could establish a connection with or via the transmitting mobile device in order to gain access to the context-sensitive information in a conventional arrangement.

Optionally, according to an aspect of the invention, determining the measure of location is performed by a location device on the moveable object or by the transmitting mobile device (which may be provided with GPS).

In this aspect of the invention, a measure of the location of the transmitter may be determined using knowledge of the location of the movable object or the transmitting mobile device, for example by using a location device, such as a GPS device, co-located with the movable object or with the transmitting device, or built-in to the transmitter, for example within the associated dynamic display. This provides accurate information for the location of the moveable object or transmitting mobile device, which is useful for transmitter locations such as on vehicles which require a greater degree of accuracy in their location due to their unpredictable and variable speed and potential to travel over large areas.

Optionally, according to an alternative aspect of the invention determining the measure of location is performed by functionality of the recipient mobile device.

As discussed above, GPS devices can be provided with/in the transmitter device but these devices are relatively expensive and power hungry. Thus, in this alternative aspect, a measure of the location of the transmitter and/or of the mobile device may be determined using a location device or function of the recipient mobile device, such as a GPS unit of the mobile device. This advantageously offloads the location function from the transmitter and/or dynamic display and/or transmitting mobile device to the recipient mobile device (and thereby reduces the power and cost of the transmitter). In this embodiment, the recipient mobile device may transmit location information to the remote server at the same time, or at a different time, to transmitting the received unique identifier to the remote server. In another embodiment, the recipient mobile device may transmit location information to the remote server only when requested to do so by the remote server. The remote server can then, for example, use the location information to provide the relevant context-sensitive information to the recipient mobile device. This allows for the provision of cheaper transmitter devices and decreases power consumption of those transmitter devices, leading to reduced battery costs or increased battery life depending on design choices.

Optionally, according to a further alternative aspect of the invention, determining the measure of location is performed by the server.

In this alternative aspect, the server may have knowledge of, or can determine, the location of the transmitter, without requiring location information to be received from the moveable object and/or from the mobile device. This knowledge may, for example, be based on a scheduled route of the transmitter and/or of the movable object. Additionally or alternatively, it may be based on previous location data received from other mobile devices and/or a location device co-located with the transmitter and/or movable object. The remote server may use this location information as a measure of the location of the transmitter to provide the relevant context-sensitive information to the mobile device, in the manner described herein.

Optionally, the tag is be a short range wireless transmitter such as a NFC, Wi-Fi or Bluetooth module, tag or token, or the transmitting mobile device comprises a short range wireless transmitter such as a NFC, Wi-Fi or Bluetooth module, and the unique identifier may be transmitted to the mobile device in an initial communication phase of the wireless protocol of the short range wireless transmitter.

The wireless protocol may be any suitable wireless communication protocol that is capable of transmitting the unique identifier. The wireless protocol is optionally a short-range wireless protocol, such as NFC, Bluetooth, Bluetooth Low Energy (BLE), or Wi-Fi for example. Accordingly, the unique identifier is transmitted by a short-range wireless transmitter. By using a short-range wireless protocol, the unique identifier will only be available to mobile devices within close proximity of the location of the short-range wireless transmitter, so that the context-sensitive information associated with the unique identifier, particularly if it is location related, is obtainable by and can only be obtained by a mobile device in or that has been in close proximity with the location of the transmitter.

In embodiments, Bluetooth, BLE and/or Wi-Fi may be preferable over NFC, because of the greater range over which the unique identifier can be transmitted. Similarly, Bluetooth and/or Wi-Fi may be preferable over BLE because of the greater range.

Thus, due to the use of only the initial communication phase of a wireless protocol, the systems and methods of the present invention can reduce the complexity of the transmitter while maintaining a relatively large range over which the unique identifier and the context-sensitive information can be transmitted and received. This then means that a single transmitter can cover a larger area, as it only needs to broadcast and doesn't need to maintain communications with multiple mobile devices, so that fewer transmitters in total may be required.

The wireless transmitter is not required to carry out any of the relatively complex processing steps involved in operating the later stages of the wireless communication protocol (i.e., pairing, communicating payload data, etc.). This then means that the wireless transmitter may comprise a relatively simple device that merely functions to transmit its unique identifier. In one embodiment, the wireless transmitter comprises a relatively small battery-powered device. Advantageously, the power demands, complexity and cost of such a device are low, and the device can be conveniently located in a wide variety of locations. Further, the transmitter can be made so as to be, effectively, a disposable device.

In one embodiment, the wireless transmitter comprises a small Bluetooth Smart module or a Bluetooth tag or token.

In another embodiment, the wireless transmitter is configured to continuously broadcast the unique identifier. However, in an alternative embodiment, the wireless transmitter is configured to broadcast the unique identifier in a non-continuous manner, such as in a periodic manner. Additionally or alternatively, the wireless transmitter may be configured to broadcast the unique identifier only when desired, such as during predicted peak periods, and may be configured to switch off at other times. These embodiments advantageously further reduce the power used by the transmitter. The timing between consecutive "on" periods may be short enough that a user of a mobile device attempting to detect the unique identifier can do so quickly and conveniently without having to wait for too long between transmissions meaning that the unique identifier is not received. For example, the timing between consecutive "on" periods may be of the order of a few seconds or less. Similarly, the duration of the "on" periods may be of the order of a few seconds or less. In this regard, the Applicants have recognised that each "on" period of the transmitter need only last for a time long enough that a mobile device is able to receive the unique identifier (i.e. during the initial stage of the communication protocol). This is because, as discussed above, the burden of determining and transmitting payload data is effectively offloaded from the transmitter (as in prior systems) onto the mobile device and the remote server (and the intervening communication network), and so the transmitter does not need to transmit other than a unique identifier.

Thus, in these embodiments, the power used by the transmitter can be substantially reduced without affecting the ability to provide the context-sensitive information. As discussed above, this means that the transmitter can advantageously be provided as a low-cost, low-complexity, low-power, and effectively disposable device.

Optionally, the context-sensitive information comprises information associated with a predetermined location or range of locations and wherein the information comprises at least one or a combination of: text, images, HTML, a URL or executable code.

In various embodiments, the location-sensitive information may comprise simple text data, image data, html data, instructions or code, and the like. For example, the context-sensitive information, particularly if it is directly related to the location of the mobile device, may comprise a marketing message associated with the particular location (i.e. a proximity marketing message), such as a shop, a billboard or a poster, etc.

In these embodiments, the method may further comprise a step of displaying the obtained location-based information on the mobile device, or of executing the instructions or code using the mobile device. For example, the context-sensitive information can comprise a URL, i.e. a webpage address. There may also be a further step of displaying the URL on the mobile device so that a user may then access a webpage. Alternatively, there may be a further step of the mobile device automatically accessing the webpage associated with the URL, and displaying the webpage on the mobile device.

In embodiments where the database is located on a remote server, the step of determining the context-sensitive information may further comprise the mobile device transmitting (sending) the unique identifier to the remote server. The remote server may then consult the database. In these embodiments, the database may comprise addresses, such as URL addresses, from which the context-sensitive information associated with each unique identifier may be obtained by the mobile device, or the context-sensitive information itself. In these embodiments, the method may further comprise the remote server sending the remote address associated with the unique identifier to the mobile device and the mobile device obtaining the context-sensitive information using the remote address, or the remote server sending the context-sensitive information associated with the unique identifier to the mobile device.

According to embodiments, the context-sensitive information that is delivered to the mobile device may be static or fixed, or may be changeable. In this latter embodiment, the context-sensitive information that is delivered to the mobile device may be manually changed as desired, e.g. by altering the database, altering the remote address or URL, by altering the information provided via the remote address or URL, and/or by changing the context-sensitive information based on a user selection. Additionally or alternatively, the context-sensitive information that is to be delivered to the mobile device may be changed automatically, for example between different predetermined sets of information. The context-sensitive information associated with a unique identifier may be changed automatically at desired points in time, for example periodically, or at different times of day. Thus, the context-sensitive information that is delivered to the mobile device can be tailored to be appropriate to the time at which it is obtained (or the time at which the unique identifier is received).

It will be appreciated by those skilled in the art that these aspects may include any or all of the optional features described herein, as appropriate.

In an alternative aspect, the system and method may further comprise steps of a user activating an application on the mobile device, and the application causing the mobile device to search for compatible unique identifiers (before the step of receiving the unique identifier). In this manner, a user of the mobile device may choose to attempt to receive unique identifiers, for example when prompted to do so by an advertisement. In an alternative embodiment, the application may be allowed to run continuously, and to continuously or periodically search for compatible unique identifiers. In an embodiment, the unique identifier may be transmitted together with an additional identifier, the additional identifier indicating that the unique identifier is a compatible unique identifier (i.e. a unique identifier that can be used to obtain context-sensitive information). The additional identifier optionally enables a mobile device to determine that it should use the received unique identifier to obtain context-sensitive information. Thus, if an additional identifier is not present in a received transmission, the mobile device may determine that it should ignore the transmission. As will be appreciated, the additional identifier need not be unique. In an alternative embodiment, the unique identifier itself is configured in a manner that indicates to a mobile device that the unique identifier is a compatible unique identifier.

In a further alternative aspect of the present invention described herein, the context-sensitive information delivered to the mobile device and/or the display of the associated dynamic sign, billboard or poster can change depending on information about the user of the mobile device. Examples of such information are: user preferences input to an application on the mobile device or on a web server (i.e. a user profile), location information provided by the mobile device, previous user behaviour and actions (such as selection of particular context-sensitive information), etc. In these embodiments, the mobile device may transmit user information, such as a user ID, to the remote server at the same time, or at a different time, to transmitting the received unique identifier to the remote server. The remote server can then modify and/or select the context-sensitive information in view of the user information before sending it to the mobile device. This then means that multiple users can each receive personalised and/or tailored context-specific information after having interacted with the same unique identifier.

The method and system of the present invention may comprise a single wireless transmitter and a single mobile device. However, in further embodiments, the method and system may comprise multiple wireless transmitters and/or multiple mobile devices. In embodiments having multiple wireless transmitters, each wireless transmitter should optionally have its own unique identifier to enable context-sensitive information to be associated with only one transmitter. A mobile device within range of more than one transmitter may act upon any number of the received unique identifiers in the manner described above, either automatically or following a selection by the user. In embodiments having multiple mobile devices, the unique identifier of the, or each, wireless transmitter will be available to each mobile device when the mobile device is within range of the wireless transmitter. Accordingly, the context-sensitive information will be accessible to each mobile device within or that has been within the range of the wireless transmitter.

It will be noted that in the above aspects and embodiments, a single, unchanging unique identifier may be used to provide different sets of context-sensitive information in different predetermined sets of circumstances. Using a single, unchanging unique identifier in this manner is particularly advantageous because it means that the transmitting device can be a relatively simple and low-power passive device that does not require the ability to change the transmitted unique ID.

In further embodiments of the present invention, the remote sever is configured to store user information and/or usage data. For example, information relating to which users requested which sets of context-specific information can be stored for later use or analysis, for example, by the content provider.

In other embodiments, the transmitter may be configured to receive and store unique identifiers of mobile devices within its proximity. The mobile devices can be configured to broadcast such a unique identifier in a similar manner to how the transmitter broadcasts its unique identifier. This information can then be stored for later use or analysis, for example, by the content provider.

According to a first general aspect of the present invention, there is provided a method of providing context-sensitive information to a mobile device, comprising transmitting via a wireless protocol a unique identifier to a mobile device, determining context-sensitive information associated with the unique identifier, and providing from a remote server the context-sensitive information associated with the unique identifier to the mobile device.

According to a second general aspect of the present invention, there is provided a system for providing context-sensitive information to a mobile device, the system comprising a wireless transmitter configured to transmit via a wireless protocol a unique identifier, a remote server, and a mobile device configured to receive the unique identifier from the wireless transmitter and to obtain context-sensitive information associated with the unique identifier from the remote server.

According to a third general aspect of the present invention, there is provided a method of providing context-sensitive information to a user of a mobile device from a database on the mobile device, comprising receiving via a wireless protocol a unique identifier to the mobile device; determining the context-sensitive information associated with the unique identifier from the database on the mobile device; and providing the context-sensitive information associated with the unique identifier to a user of the mobile device.

According to a fourth general aspect of the present invention, there is provided a system for providing context-sensitive information to a user of a mobile device from a database on the mobile device, the system comprising a wireless transmitter configured to transmit via a wireless protocol a unique identifier, and a mobile device configured to receive the unique identifier from the wireless transmitter and to determine the context-sensitive information associated with the unique identifier from the database.

According to a generalised aspect of the present invention, there is provided a method of providing context-sensitive information to a mobile device, comprising transmitting via a wireless protocol a unique identifier to the mobile device; determining the context-sensitive information associated with the unique identifier; and providing the context-sensitive information associated with the unique identifier to the mobile device.

According to a further generalised aspect of the present invention, there is provided a system for providing context-sensitive information to a mobile device, the system comprising a wireless transmitter configured to transmit via a wireless protocol a unique identifier, and a mobile device configured to receive the unique identifier from the wireless transmitter and to obtain context-sensitive information associated with the unique identifier.

Optionally, the unique identifier changes over time in accordance with an algorithm used to encode the unique identifier at the tag and used to decode the unique identifier at either the mobile device or the server.

Changing the unique identifier over time can prevent third parties or unauthorised users from using installed tags for unauthorised purposes, or can enable the tags to transmit metadata or information embedded in the unique identifier.

Optionally, the unique identifier changes over time in accordance with an algorithm used to encode the unique identifier at the tag to incorporate a data payload or alternates between two or more algorithms used to encode the unique identifier at the tag to incorporate said data payload.

Changing the unique identifier over time can prevent third parties or unauthorised users from using installed tags for unauthorised purposes, or can enable the tags to transmit metadata or information embedded in the unique identifier or can enable a tag to provide more than a single function.

Optionally, the algorithm encodes the unique identifier differently each time the tag transmits the encoded unique identifier.

Changing the unique identifier over time can prevent third parties or unauthorised users from using installed tags for unauthorised purposes, or can enable the tags to transmit metadata or information embedded in the unique identifier or can enable a tag to provide more than a single function or enables the tag to transmit sequential portions of a volume of data.

Optionally, the algorithm encodes the unique identifier in response to a data source wherein the data source comprises at least one of sensor data; alert data; asset tracking data; status data; encryption; event data; external stimulus data or sequential portions of a sequence of data.

Changing the unique identifier over time can prevent third parties or unauthorised users from using installed tags for unauthorised purposes, or can enable the tags to transmit metadata or information embedded in the unique identifier or can enable a tag to provide more than a single function by providing data such as sensor data; alert data; asset tracking data; status data; encryption; event data; external stimulus data or sequential portions of a volume of data.

Optionally, the server provides information for display on the mobile device based on an application ID in addition to said unique identifier and said measure of location.

Providing information for display on the mobile device that also takes into account the application ID enables the re-use of a single unique identifier with a plurality of applications to provide content relevant to the application being used.

According to a further aspect of the present invention, there is provided a method of providing context-sensitive information to a mobile device, comprising: transmitting via a wireless protocol a unique identifier associated with the protocol to a mobile device, transmitting the unique identifier to a remote server from the mobile device, and returning context-sensitive information associated with the unique identifier from the remote server to the mobile device.

Optionally the unique identifier is transmitted to the mobile device in an initial communication phase of the wireless protocol.

Optionally, the unique identifier is transmitted to the mobile device without requiring any verification or security at the mobile device, for example without requiring the mobile device to transmit a PIN, a password, biometric data (such as a fingerprint scan, facial recognition data, etc.) or any other security code or verification information.

Optionally the context-sensitive information comprises information associated with a particular location where a transmitting device that transmits the unique identifier is located.

Optionally, the context-sensitive information comprises at least one of: text data, image data, html data, instructions or code, a URL, and combinations thereof.

Optionally, the context-sensitive information comprises marketing information associated with the location of the device transmitting the unique identifier, optionally a proximity marketing message, optionally associated with a shop, a billboard, a poster, or any other feature associated with the location of the device transmitting the unique identifier.

Optionally, there occur the further steps of displaying the returned context-sensitive information on a screen of the mobile device, and/or executing instructions or code on the mobile device.

Optionally, the context-sensitive comprises a URL, and the step of displaying the returned context sensitive information comprises displaying the URL on a screen of the mobile device, so that a user may access the associated webpage by interaction with the mobile device, and/or the step of executing instructions or code on the mobile device comprises the mobile device automatically accessing the webpage associated with the URL, and displaying the associated webpage on a screen of the mobile device.

Optionally, a mobile device receives the unique identifier only when the mobile device is within range of the device transmitting the unique identifier, optionally within a range of about 100 meters, optionally within a range of about 50 meters, optionally within a range of about 20 meters, optionally within a range of about 10 meters, optionally within a range of about 2 meters, optionally within a range of less than 1 meter.

Optionally, the unique identifier comprises at least one of a Universally Unique Identifier (UUID) and a MAC address.

Optionally, the wireless protocol is a short-range wireless protocol, optionally at least one of NFC, Bluetooth or Wi-Fi.

Optionally, the unique identifier is transmitted by a short-range wireless transmitter, the transmitter optionally being at least one of an NFC, a Bluetooth or a Wi-Fi transmitter.

Optionally, the mobile device does not interact with or use the wireless protocol beyond receiving the unique identifier from the initial stage of the wireless protocol.

Optionally, the short-range wireless transmitter is configured to only run an initial phase of the wireless protocol.

Optionally, the wireless transmitter comprises a small Bluetooth Smart module or a Bluetooth tag or token.

Optionally, the unique identifier is transmitted either continuously or in a non-continuous manner, optionally in a periodic manner, or combinations thereof.

Optionally, the step of returning the context-sensitive information associated with the unique identifier comprises comparing the unique identifier to unique identifiers stored in a database or databases to identify the context-sensitive information associated with the stored unique identifier and providing the associated context-sensitive information to the mobile device.

Optionally, there is the further step of storing the unique identifier on the mobile device, and transmitting the unique identifier to the remote server after a time delay and/or in response to another event.

Optionally, there is the further step of: activating an application on a mobile device, the application configured to cause the mobile device to search for compatible unique identifiers, thereby enabling the mobile device to receive and subsequently transmit the unique identifier.

Optionally, there is the further step of transmitting to the mobile device a non-unique identifier in the same wireless protocol, the non-unique identifier identifying the system with which the transmissions are associated to enable a mobile device to determine whether to transmit the unique identifier to a remote service or to ignore the unique identifier.

According to a further aspect of the present invention, there is provided a system for providing context-sensitive information to a mobile device, the system comprising: a wireless transmitter configured to transmit via a wireless protocol a unique identifier associated with the protocol, a server, and a mobile device configured to receive the unique identifier from the wireless transmitter and to transmit the unique identifier to the server to obtain context-sensitive information associated with the unique identifier from the server.

Optionally, the server is a remote server, the mobile device capable of wireless communication with the remote server by at least one of Wi-Fi, Bluetooth, GSM, GPRS, 4G and combinations thereof.

Optionally, the mobile device comprises the server.

Optionally, the wireless transmitter is configured to transmit only an initial phase of a wireless protocol, the initial phase comprising the unique identifier.

Optionally, the wireless transmitter is configured to additionally transmit a non-unique identifier, optionally also comprised in an initial phase of a wireless protocol.

Optionally, the mobile device comprises at least one of: a mobile computer, mobile phone, smartphone, or tablet computer.

Optionally, the mobile device comprises a wireless module comprising at least one of a Bluetooth module, a Wi-Fi module and/or an NFC module.

Optionally, the wireless transmitter comprises a Bluetooth Smart module or a Bluetooth tag or token.

Optionally, the wireless transmitter is configured to broadcast the unique identifier, optionally either at intervals (optionally periodically) or continuously, or combinations thereof.

Optionally, the server comprises and/or communicates with at least one database, the database containing an entry for each unique identifier and context-sensitive information associated therewith.

Optionally, the database comprises a MySQL database.

Optionally, the mobile device comprises the database and the database optionally comprises remote addresses, such as URL addresses, from which the context-sensitive information associated with each unique identifier may be obtained by the mobile device.

Optionally, the remote server is a web server, the remote sever optionally being configured to communicate with the mobile device using the same wireless protocol as the wireless transmitter and/or using a second, different wireless protocol, such as WAP, GSM, 3G, and the like.

Optionally, the mobile device comprises an app, the app configured control and/or authenticate the various communications.

Optionally, the mobile device does not interact with or use the wireless protocol beyond receiving the unique identifier from the initial phase of the wireless protocol.

Optionally, the wireless transmitter is configured to only run an initial phase of the wireless protocol.

Optionally, the unique identifier is transmitted to the mobile device from an embedded device.

Optionally, the unique identifier is transmitted to the mobile device from an embedded device.

Figure 2:
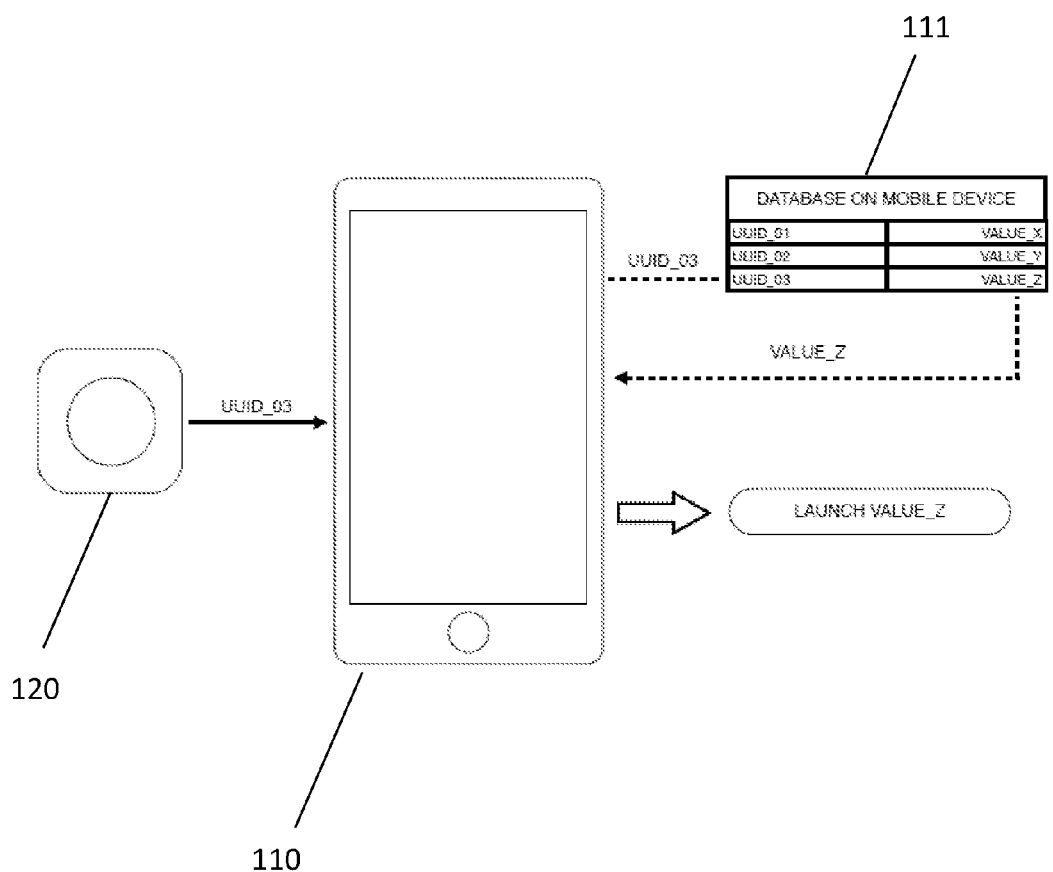
Figure 3A:
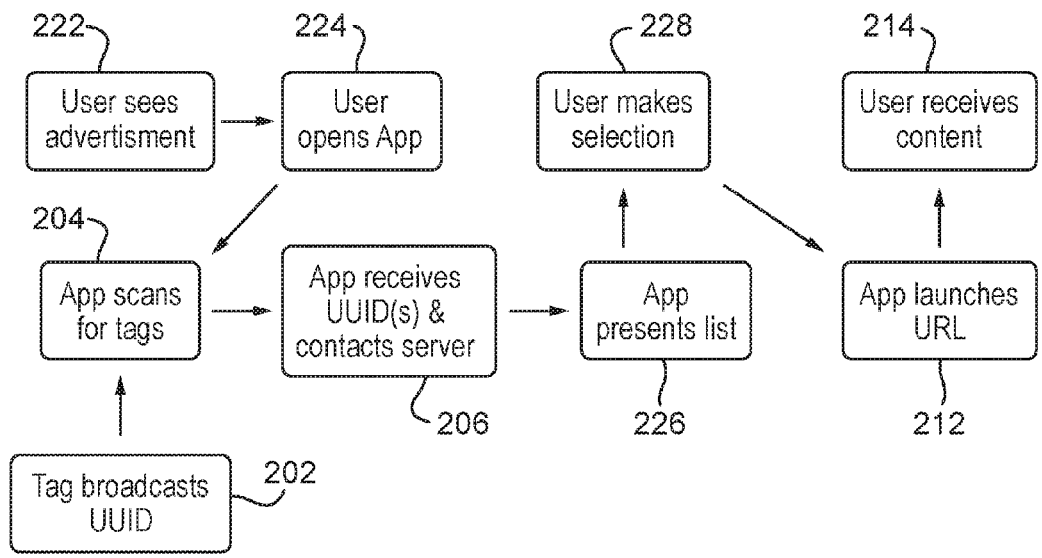
Figure 3B:
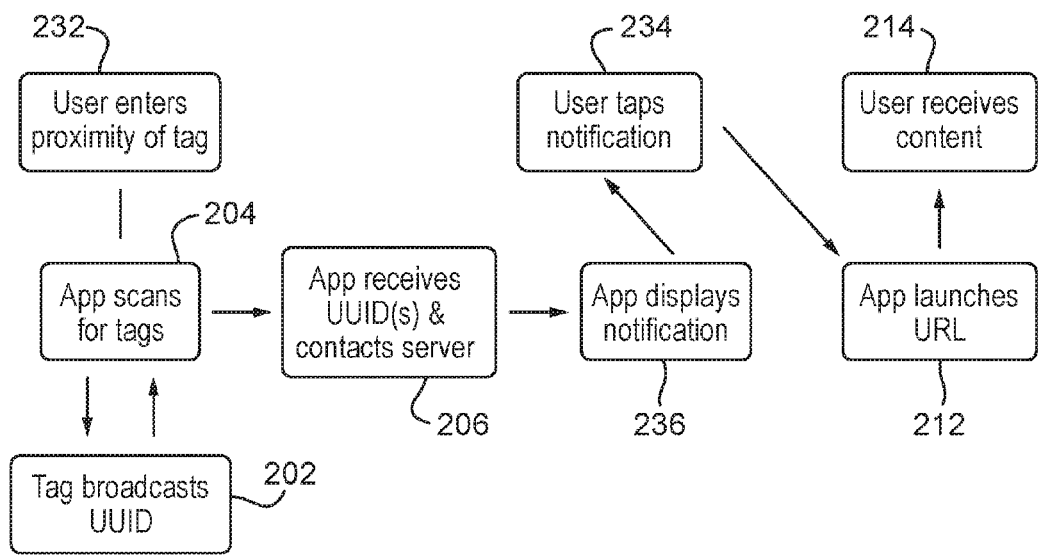
Figure 4:
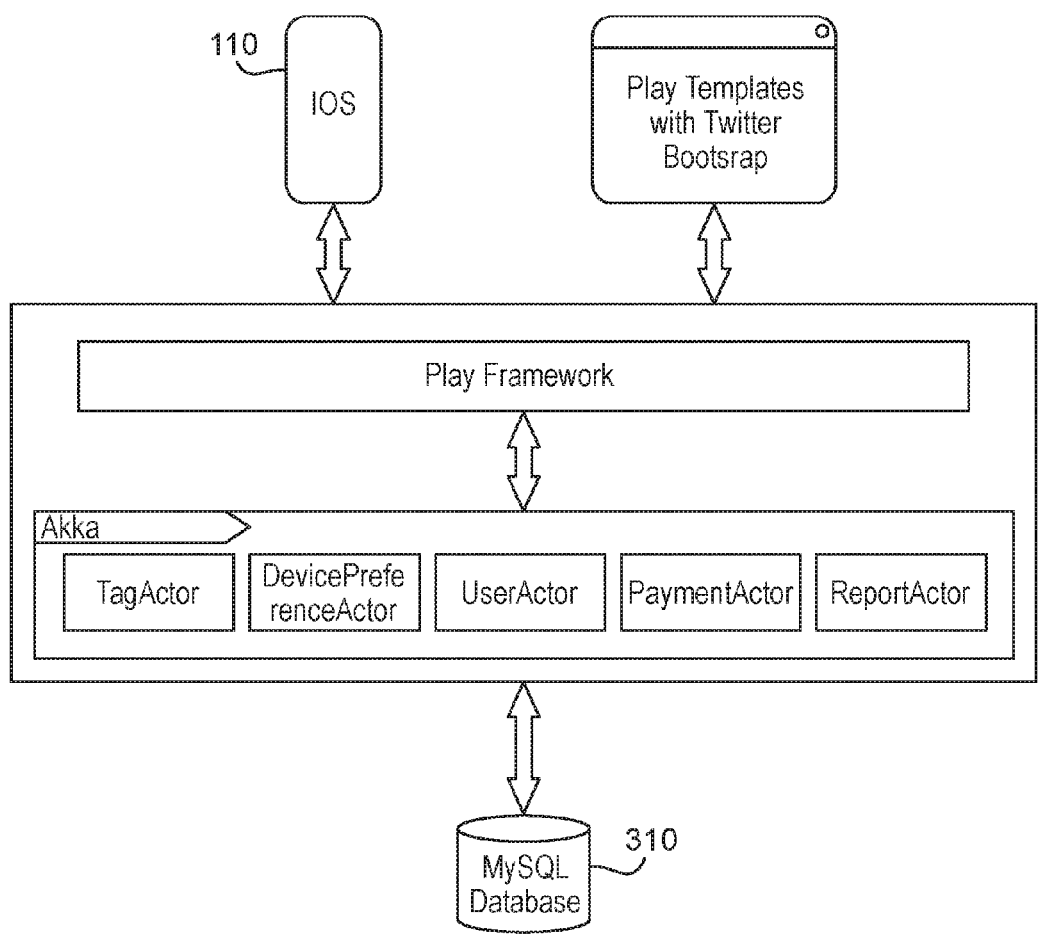
Figure 5:
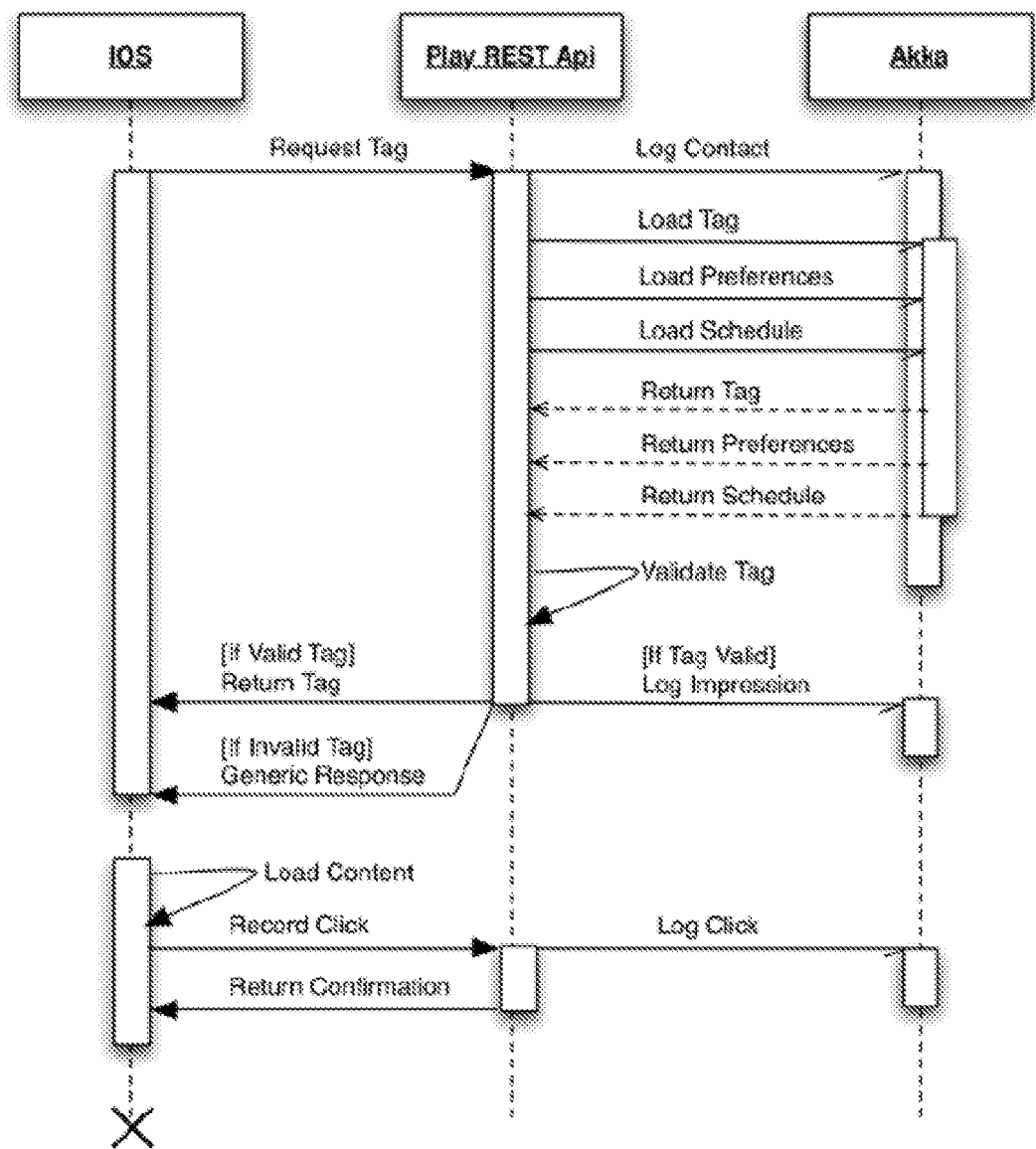
Figure 6:
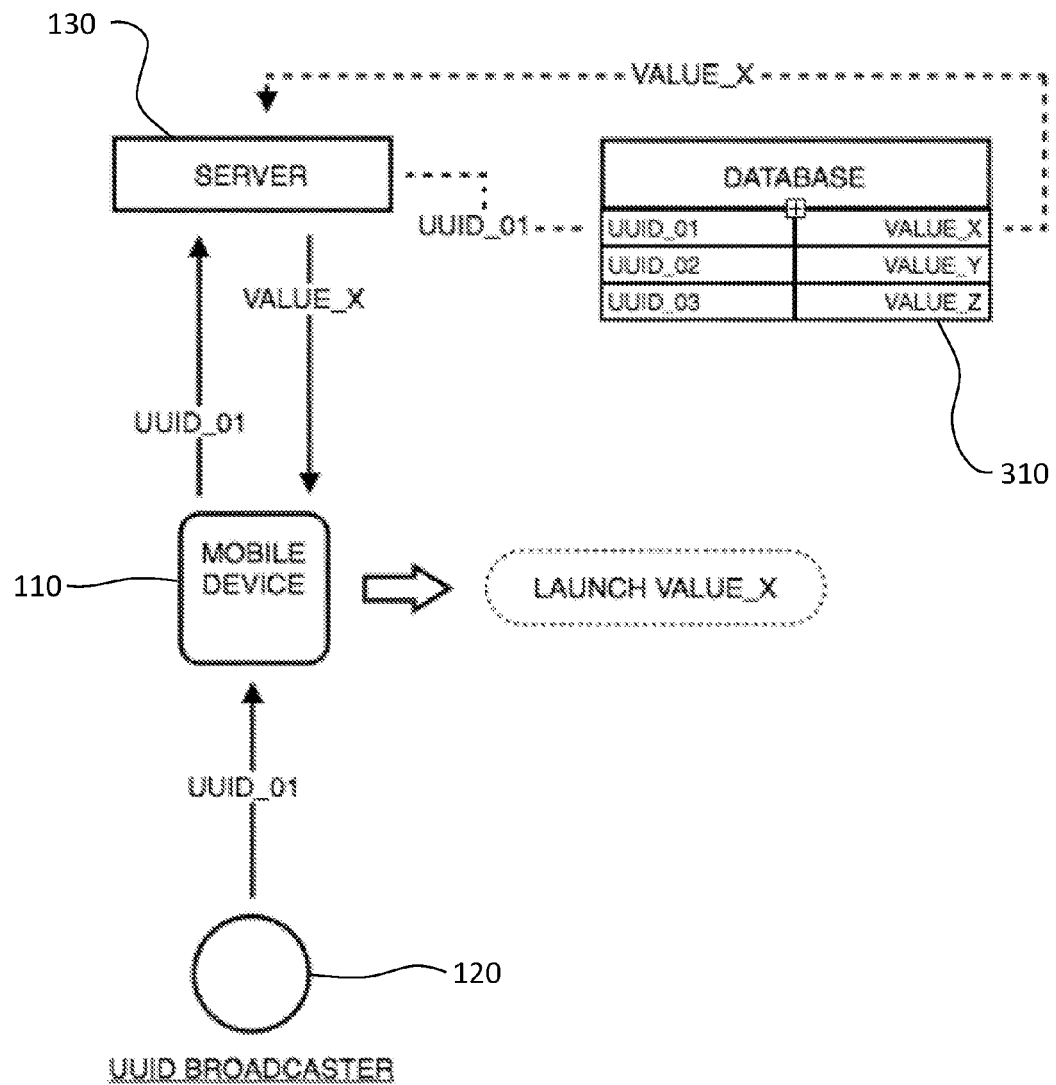
Figure 7:
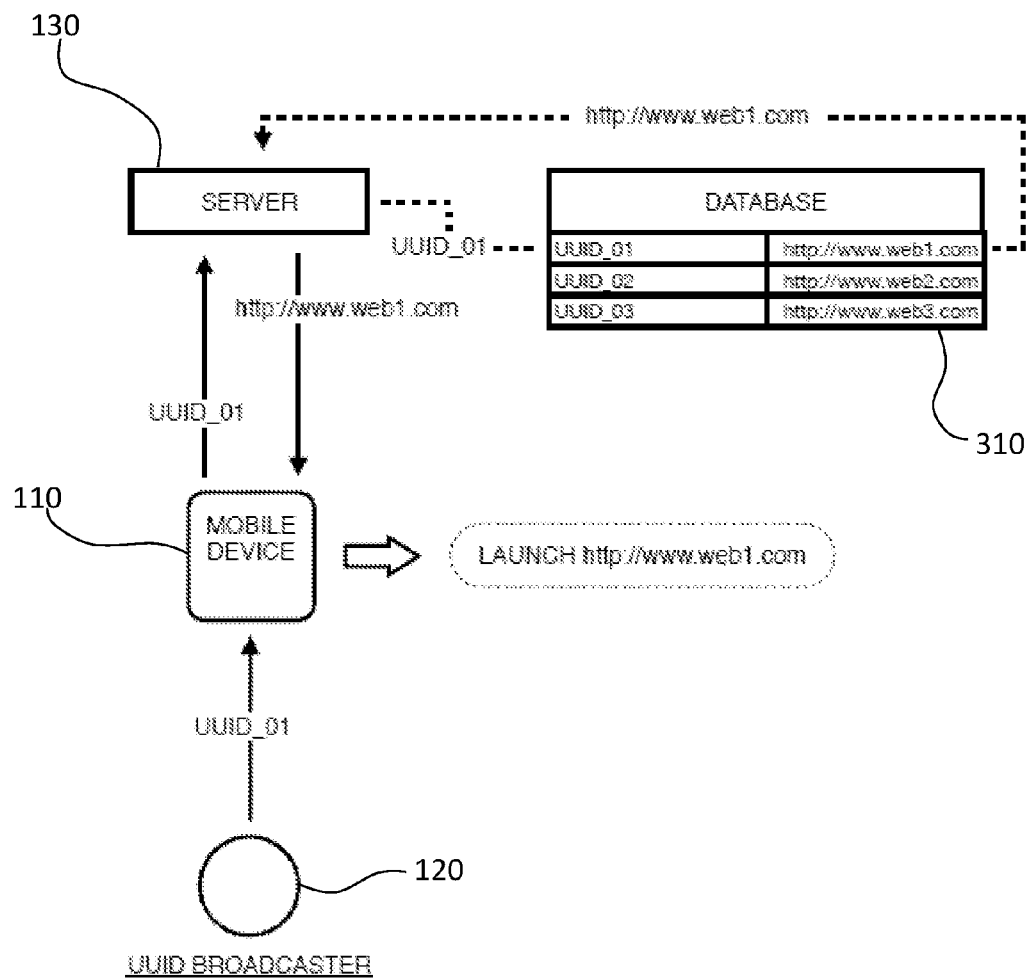
Figure 8:
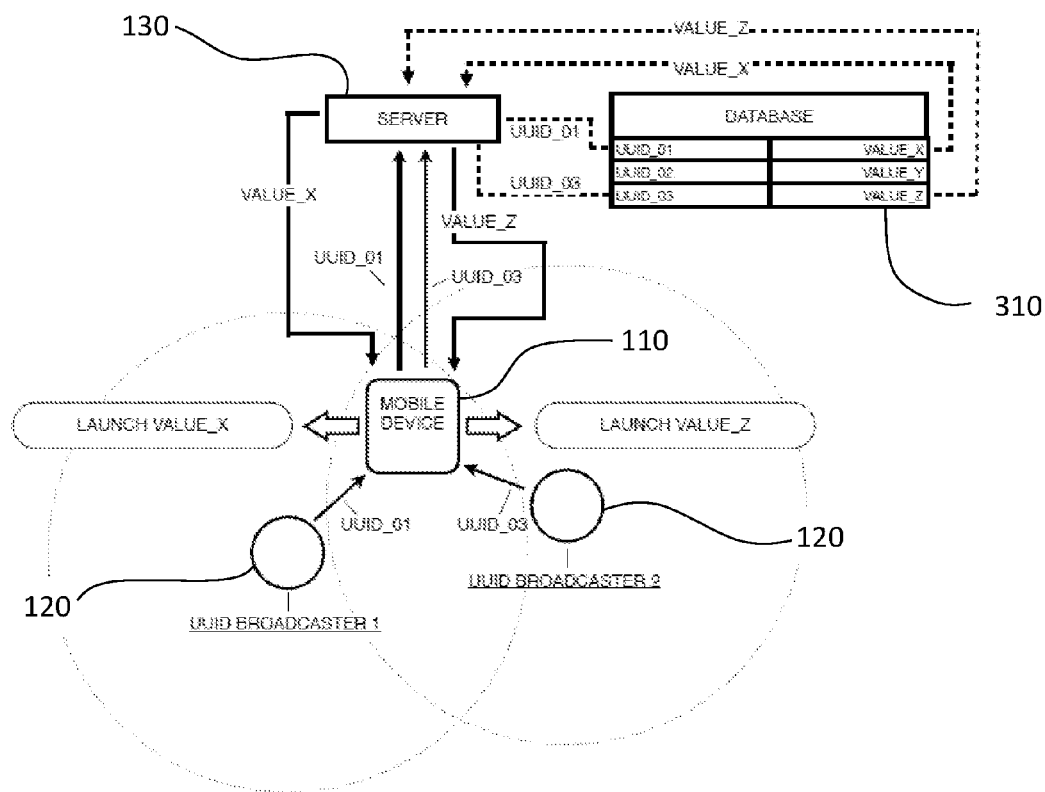
Figure 9:
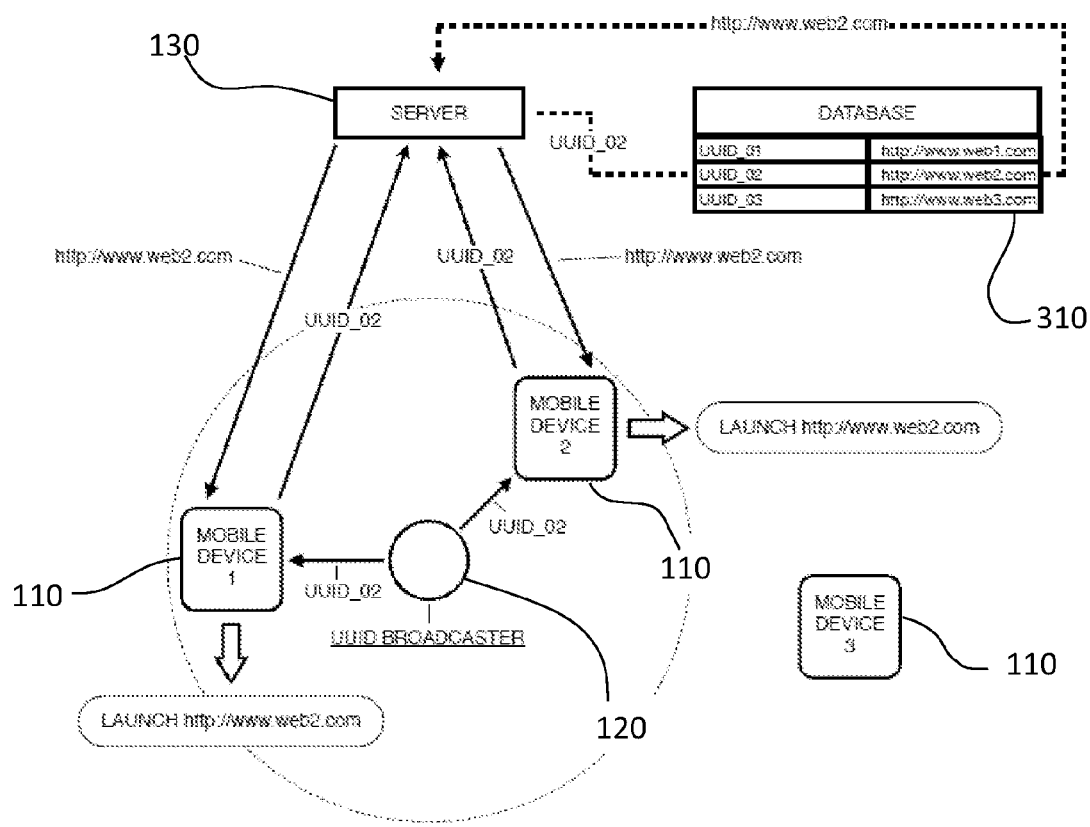
Figure 10:
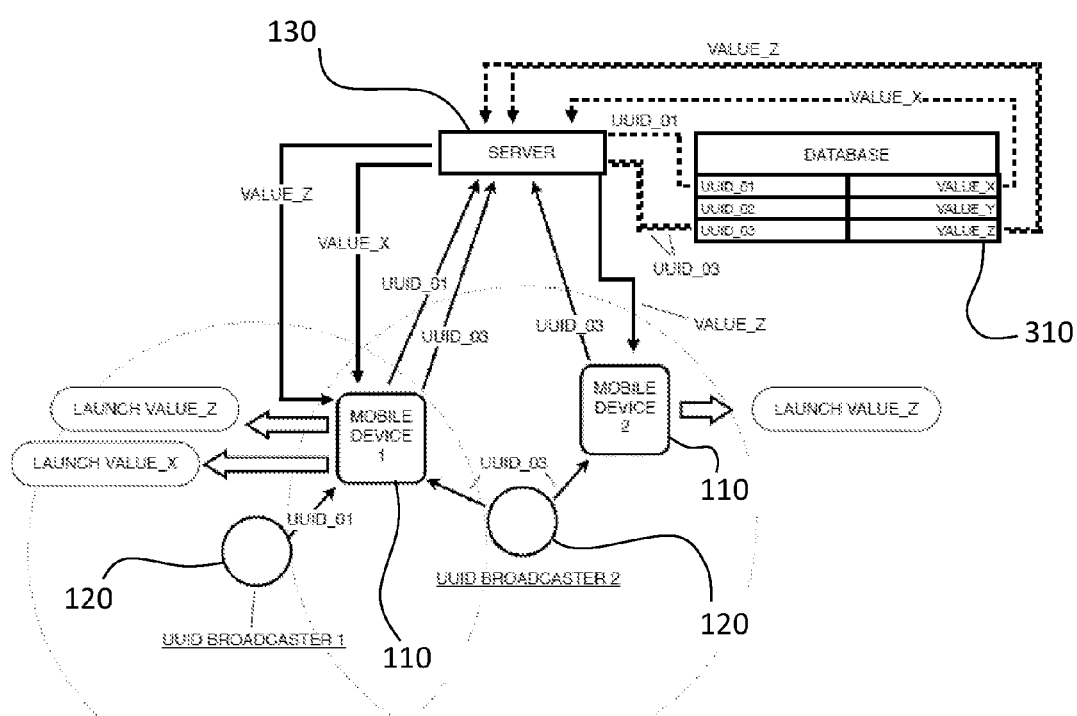
Figure 11:
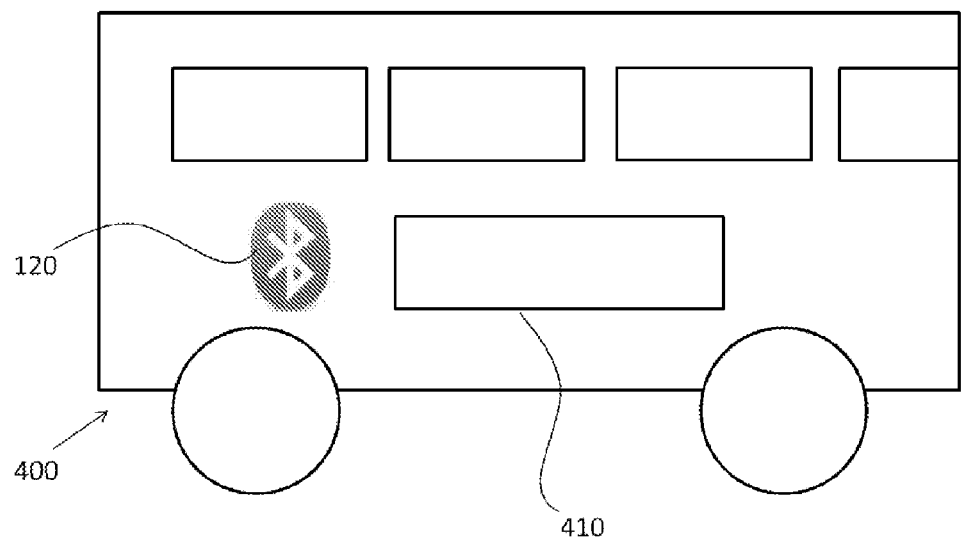
Figure 12:
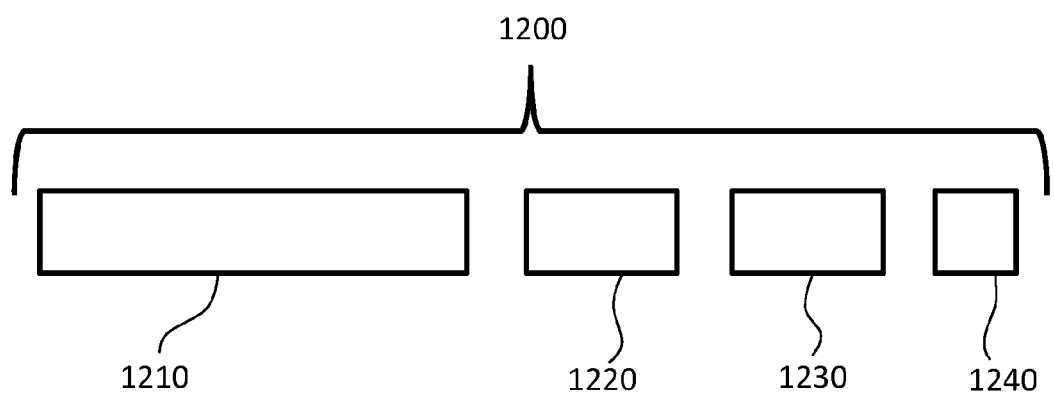

Various embodiments of the present invention will now be described with reference to the accompanying drawings having like-reference numerals in which:

FIG. 1 schematically illustrates a system in accordance with embodiments of the present invention, in which a mobile device interacts with a Bluetooth tag and a remote server;

FIG. 2 schematically illustrates a system in accordance with embodiments of the present invention, in which URLs are stored on a mobile device;

FIGS. 3A and 3B are flow diagrams illustrating methods in accordance with embodiments of the present invention, in which a user of an application on a mobile device may receive context-sensitive information via a URL;

FIG. 4 schematically illustrates a server architecture in accordance with embodiments of the present invention;

FIG. 5 schematically illustrates an API workflow in accordance with embodiments of the present invention;

FIG. 6 schematically illustrates a system in accordance with embodiments of the present invention, in which a mobile device receives a UUID from a broadcaster, the mobile device sends the UUID to a server, and the server sends an associated value to the mobile device;

FIG. 7 schematically illustrates a system in accordance with embodiments of the present invention, in which a mobile device receives a UUID from a broadcaster, the mobile device sends the UUID to a server, and the server sends an associated URL to the mobile device;

FIG. 8 schematically illustrates a system in accordance with embodiments of the present invention, in which a single mobile device interacts with multiple UUID broadcasters;

FIG. 9 schematically illustrates a system in accordance with embodiments of the present invention, in which multiple mobile devices interact with a single UUID broadcaster;

FIG. 10 schematically illustrates a system in accordance with embodiments of the present invention, in which multiple mobile devices interact with multiple UUID broadcasters;

FIG. 11 schematically illustrates an embodiment of the present invention, in which a transmitter is located on a movable object in conjunction with a billboard; and FIG. 12 schematically illustrates an example of a Bluetooth LE broadcast packet broken into the components of the packet showing the major and minor values.

FIG. 1 illustrates a system 100 for providing context-sensitive information, such as proximity marketing information, to a mobile device in accordance with embodiments of the present invention. The system 100 comprises a mobile device 110, which in this illustration is a smartphone, a Bluetooth tag 120, and a remote server 130. The various connections between these elements are illustrated generally by the arrows in FIG. 1. In this embodiment the elements work in unison to present a user of the mobile device 110 with specified content in the form of a webpage loaded onto the mobile device 110 when the mobile device 110 comes into proximity of the Bluetooth tag 120.

The mobile device 110 has an application or software ("app") installed, and the remote server 130 has compatible software installed. The Bluetooth tag 120 is configured to broadcast its Universally Unique Identifier (UUID), while the app is configured to use the Bluetooth capabilities of the mobile device 110 to scan for compatible UUIDs. When the app receives a compatible UUID, it sends the UUID to the remote server 130. Upon receiving the UUID, the server determines an associated URL by consulting a database (not shown), and returns the URL to the app on the mobile device 110. The application on the mobile device 110 is configured to then launch the URL and to display the information therein.

The URL can either be stored on the mobile device 110 itself, or on a remote server 130. If the URL value is stored on the mobile device 110, the UUID can trigger a URL launch on the mobile device 110. If the UUID and associated or attributed URL values are stored on the remote server 130, the mobile device 110 must first send the UUID received from the Bluetooth tag 120 to the remote server 130, before it can receive the URL attributed to the specific UUID. FIG. 2 shows an embodiment in which the URLs are stored on the mobile device 110 in a local database 111.

The UUID effectively acts as a trigger for predefined actions with predefined values. UUID's are broadcast from the Bluetooth Low Energy Module 120, and the same UUID's are stored on the mobile device 110 or the remote server 130 or database 310. Each UUID may have an action and a value attributed to it, such that when a UUID is received by the mobile device 110, the attributed action is performed with the attributed value.

In an embodiment, the Bluetooth tag 120 is a small Bluetooth Smart module encased in durable plastic and powered by a battery. The Bluetooth tag 120 has a UUID programmed onto its Bluetooth chip, which is unique to each tag. A piece of firmware constantly runs on the Bluetooth tag 120, instructing the tag 120 to broadcast its UUID. Written into the broadcast is also a separate identifier that identifies the broadcast as compatible with the app running on the mobile device 110. This ensures that the app only communicates with compatible Bluetooth tags, rather than with every Bluetooth Smart device in its proximity.

In the present embodiment, on power-up of the Bluetooth tag 120, the firmware installed on the Bluetooth tag 120 instructs the tag to initialize an "application loop" that causes the device to alternatively broadcast its UUID, and to go into a "sleep" mode. For example, the firmware may follow operate according to the following steps: 1.1: Board Bring up; 1.2: Peripheral Initialization; 1.3: BLE Stack Initialization; 1.4: Application Loop; 1.4.1: Advertise; 1.4.2: Sleep. This process can then be repeated after a certain interval, or in response to an external stimulus, or on an event-driven or manual basis.

FIGS. 3A and 3B illustrate alternative methods in accordance with embodiments of the present invention, in which a user of the mobile device may choose to receive the context-specific information.

The application or app installed on the mobile device 110 makes the mobile device 110 act as an intermediary between the Bluetooth tag 120 and the remote server 130 to present the user with the specified content. As discussed above, in operation the Bluetooth tag 120 broadcasts 202 its UUID. At the same time, the app on the mobile device 110 scans for the signals 204 from compatible Bluetooth tags using the Bluetooth capabilities of the mobile device 110. Upon finding a compatible signal, the app on the mobile device 110 captures the UUID and contacts 206 the remote server 130. By communicating with the remote server 130, the app on the mobile device 110 is able to present the user of the mobile device 110 with more information about the tag 120, and may launch or display 212 any content associated with the tag 120, so that the user receives 214 the content.

In the embodiment illustrated in FIG. 3A, when a user of the mobile device 110 sees, for example, an advertisement 222 such as a billboard or poster that they are interested in, the user opens 224 the application on the mobile device 110. The application may the present the user with a list 226 of all nearby compatible Bluetooth tags 120. The user may then select 228 the item that they are interested in, and the application will launch 212 the associated URL.

In the embodiment illustrated in FIG. 3B, the user has previously allowed notifications on the mobile device 110 from the application. When the mobile device 110 comes into proximity 232 of a compatible Bluetooth tag 120, the application will notify the user. If the user selects the notification 234, the associated URL will be launched 212 on the mobile device 110.

FIG. 4 schematically illustrates the architecture of the remote server 130 in accordance with the present embodiment. The remote server 130 stores the Bluetooth tag UUIDs and their attributed URLs and information. When the application on the mobile device 110 sends a UUID to the server 130, the server compares the UUID to a list of UUIDs stored on its database 310. The server 130 retrieves the URL and information attributed to the UUID and sends it back to the application running on the mobile device 110 to be launched.

To prevent a user being shown the same URL and/or information attributed to the UUID too frequently, the remote server 130 or mobile device 110 can prevent the same content from being shown more than once in a specified time period, for example in any 24 hour period.

In an alternative embodiment, the app on the mobile device 110 has an app ID which is transmitted along with the UUID to the remote server 130. The server 130 in this embodiment would store the Bluetooth tag UUIDs along with the app IDs and their attributed URLs and information. When the application on the mobile device 110 sends a UUID and app ID to the server 130, the server compares the UUID and app ID to a list of UUIDs and app IDs stored on its database 310. The server 130 retrieves the URL and information attributed to the UUID when combined with the app ID and sends it back to the application running on the mobile device 110 to be launched.

Returning to the previous embodiment, the server comprises a relational database 310, such as a MySQL database for storing all the data; Play Evolution is used for managing database schema changes such as new columns and tables; Slick or Anorm is used for database querying & modelling; Akka is used to enable message based parallel executions; Twitter Bootstrap is used to provide a consistent and user friendly user interface; and Play Framework is used for the REST and Web interfaces. This may sit on top of Akka and hide the complexity. Alternatively, the Akka actor model may be exposed to allow more control over the asynchronous operations and message based concurrency, thus improving the ability to scale.

FIG. 5 schematically illustrates the REST API workflow in accordance with the present embodiment. The REST API is exposed to mobile devices 110 and is designed to serve content information and record usage. All communication uses JSON.

In the present embodiment, the workflow is as follows: when a mobile device 110 receives a signal from a Bluetooth tag 120 a REST request is sent to the server 130 containing the device ID and the unique identifier of the Bluetooth tag 120. The server 130 then performs the following steps: (i) "contact" log is asynchronously recorded against this device 110 and tag 120; (ii) the tag information is loaded from the database 310, including category and organisation information; (iii) the preferences (categories and organisation blacklist) of the user are loaded from the database 310 if present; (iv) the device schedule information is loaded from the database 310; (v) if the tag information is acceptable to the device 110 then an "impression" log is asynchronously recorded and the tag information returned to the user; (vi) of the tag information is not acceptable then a generic response is sent to the device 110. The device 110 uses the tag information to load the content, and a request is then sent to the server 130 to confirm this. The server 130 receives this request and logs a "click" against the device 110 and tag 120. The logs are all stored in database tables to be queried at a later date by the admin web interface.

Large numbers of requests and therefore logs may be dealt with by: (i) aggregating the logs each day/month, combining the initial one row per device for each contact/impression/click into one row containing a total number of contacts/impressions/clicks per device. This enables the ability to see trends more detailed than the aggregated data, for example minutely/hourly trends; (ii) performing pre-defined queries each night to be cached for the following day; (iii) introducing an in memory cache such as Redis; and/or (iv) splitting out the logs into a separate database. Two such options are mongoDB and Cassandra.

Each mobile device 110 can have category and organisation preferences/blacklists associated with it. To store these preferences the application can send a JSON request to the server 130 containing the list of preferences, these are then stored in the database 310 against the device ID.

As discussed above, the systems and methods of the present invention can function when there is only a single broadcasting device and a single mobile device 110. For example, FIG. 6 shows a UUID broadcaster triggering a mobile device 110 to send a UUID to a server 130. The UUID triggers the server 130 to send a value to the mobile device 110 for launch. FIG. 7 shows a UUID broadcaster 120 triggering a mobile device 110 to send a UUID to a server 130. The UUID triggers the server 130 to send a URL to the mobile device 110 for launch.

These systems and methods can, however, function when many broadcasters and many mobile devices are present. FIG. 8 shows an embodiment having one mobile device and multiple UUID broadcasters. If a mobile device 110 is in proximity of two broadcasting devices then it will repeat the process described above for both broadcasters and their UUIDs. The mobile device will perform the actions attributed to both tags.

Similarly, the system allows for there to be multiple mobile devices in the proximity of a single broadcaster. The broadcasting device will broadcast it's UUID to both mobile devices, allowing the mobile devices to perform the attributed actions. FIG. 9 shows an embodiment having multiple mobile devices, and one UUID broadcaster 120. FIG. 10 shows an embodiment having multiple mobile devices, and multiple UUID broadcasters.

The system of the present embodiment does not require the mobile device 110 to be 'paired' to the Bluetooth tag 120 in any way (the same is true with respect to other wireless broadcasting devices, e.g. Wi-Fi, that it is not necessary to establish a communications connection with the mobile device). Because the system does not rely on pairing or forming a connection between a mobile device 110 and a broadcasting device, the broadcasting device is able to broadcast its signal to many mobile devices at once, without being limited or slowed down by needing to pair with each device (often requiring a password, and having many limitations as described above).

In the present embodiment, there needs to be very little actual interaction between the mobile device 110 and the broadcasting device in comparison with conventional wireless protocol negotiation and/or handshaking, such as when pairing over Bluetooth. Once the mobile device 110 has captured the UUID being broadcast from the broadcasting device 120, no further interaction between the two devices is needed. Even if the mobile device goes out of range of the broadcaster, the mobile device 110 will be able to perform the UUID specific actions separately from the broadcaster. The broadcasting device is simply the trigger.

Embodiments described above require the mobile device 110 to have an internet connection in order to communicate with the remote server 130 or database 310 to send and receive the necessary data. There are times and locations, however, where an internet connection is not available (e.g. on the London Underground). However, as discussed above, no internet connection is required for the mobile device 110 and the broadcasting device to communicate. Thus, even if there is no internet connection, the broadcasting device can still broadcast its UUID to all compatible mobile devices within its proximity. In an environment with no internet connection, therefore, the mobile device is configured to capture the broadcast UUID as discussed above. Instead of sending the UUID to the server 130 immediately, however, the mobile device 110 will save the UUID for later use. The UUID can be saved to a database within the mobile device 110, to be used at a time when an internet connection is available. At this point, the mobile device 110 will send the UUID to the remote server 130 and continue the workflow discussed above as normal. Alternatively, as mentioned above, a cache of information may be pre-loaded on to the mobile device 110 and the context-sensitive information associated with the received UUID can be displayed immediately, even without an internet connection.

FIG. 11 depicts an embodiment wherein the broadcasting device 120 is located on a moveable object. In the depicted embodiment, the moveable object is a bus 400. As the bus 400 travels along its scheduled route, a display of a dynamic billboard 410 and/or the context-sensitive information that is provided to a mobile device is changed based on the location of the bus 400 and/or of the mobile device.

FIG. 12 depicts an example of a typical wireless broadcast communication 1200, typically used to advertise the availability of a wireless device such as a device using the Bluetooth LE protocol. In this typical wireless broadcast communication 1200 there are a sequence of communication elements within the broadcast packet 1200: a "universally unique identifier" or UUID 1210; a "major" function or value or data portion 1220; a "minor" function or value or data portion 1230 and a final data portion or TX tower 1240. In a standard implementation of a system using these wireless broadcast communications 1200, a first device advertising its availability on a wireless protocol would transmit these wireless broadcast communications 1200 at regular intervals. When a second device receives one of the wireless broadcast communications 1200, it transmits a response data packet to the first device to indicate that it has received the wireless broadcast communication 1200 packet and is initiating a connection over the wireless protocol between the first and second devices. In most implementations of this form of "handshaking" or "pairing" where a connection is made over the wireless protocol between the first and second devices, the first device will stop transmitting wireless broadcast communications 1200 until the connection between the first and second device has been made.

An embodiment adapts the above typical use of the wireless broadcast communication 1200 for a different function and in order to reduce power usage requirements. Instead of accepting a response packet in response to the wireless broadcast communications 1200, the first device only ever transmits wireless broadcast communications 1200. This has the advantage of reducing power consumption in the first device and avoids the need to stop transmitting wireless broadcast communications 1200 until the connection between the first and second device has been made. This also allows the first device to operate as a transmitter to a plurality of data to devices configured to receive the data transmitted without requiring a handshake or pairing operation to take place, thus allowing a plurality of devices in range of the transmitting device to receive the data transmitted.

In an alternative embodiment, the wireless broadcast communication 1200 contains data to be broadcast to devices such as mobile phones and tablets over a wireless protocol, for example over Bluetooth, Bluetooth LE or IEEE 802.11x protocols such as Wi-Fi. Specifically, data can be broadcast in the "major" and "minor" data portions 1220, 1230 of the broadcast packet 1200.

In certain mobile device operating systems, such as Apple iOS, the UUID 1210 needs to be pre-configured or pre-loaded into the mobile device in order for the mobile device to recognise the data being transmitted, so can't be used to broadcast data. Typically, an application or piece of software that can be installed on the mobile phone will be pre-configured to receive any data transmitted with a pre-determined UUID. In other mobile device operating systems, such as Google Android, the entire content of the wireless broadcast communication 1200 can be read by software or application installed on the mobile device. In some embodiments, therefore, the entire wireless broadcast communication 1200 can be used to broadcast data.

One use of the wireless broadcast communication 1200 would be to advertise that a device transmitting the communication 1200 is in a certain location. To achieve this, a unique string of data is broadcast in the "major" and "minor" data portions. Devices that receive this unique string of data can then check this against a database of locations where locations are mapped to the unique strings of data for a plurality of transmitting devices. The database can be located on the devices that receive the communications 1200 or on a remote device in communication with the devices that receive the communications 1200, for example a server available via the internet.

To prevent non-compatible or unauthorised third-party access to the broadcasted data, some embodiments encode portions of the wireless broadcast communication 1200, in particular the unique string of data broadcast in the "major" and "minor" data portions. The method of encoding can vary, but one method would be to modify the unique string of data over time using an algorithm stored only on the broadcasting device and the devices that receive the communications 1200 or, for added security, known only on the broadcasting device and a remote device in communication with the devices that receive the communications 1200.

In an alternative embodiment, instead of (or as well as) transmitting location data using the wireless broadcast communication packets 1200, other data could be transmitted such as data relating to an external stimulus. Examples of such data would be temperature data based on a reported temperature from a temperature sensor in communication with the device transmitting the wireless broadcast communication packets 1200. Other example data would be status data for devices such as locks or doors, indicating whether a lock is locked or unlocked or whether a door is closed or open, or alert data to indicate a fault or emergency situation.

In a further alternative embodiment, the data transmitted within the wireless broadcast communication packets 1200 can be changed between broadcasts, such that the sequential data can be collected by receiving devices and joined together to form a piece of data that is larger than would otherwise be possible to transmit in a single wireless broadcast communication packet 1200—for example a photo or picture, or video or even executable code. This enables broadcast transmission of data to mobile devices in range of a broadcast device to receive data in environments where it would otherwise be difficult to transmit and receive data, for instance in tunnels or areas with no mobile data signal. The data would be stored on the broadcast device and a repeating sequence of wireless broadcast communication packets 1200 would be transmitted.

Embodiments can be adapted for many uses, including for real-time location tracking or asset management. To do this, one or more reader devices able to receive and process a plurality of wireless broadcast communication packets 1200 from a respective plurality of tags is provided. Users of the system can then use user interfaces provided on user devices, such as desktop computers or mobile devices, the user devices being in communication with the one or more reader devices. The reader devices may be in communication with each other in a networked arrangement or may operate in a standalone fashion.

A reader device, for example, may be integrated into a bus shelter or street light and can monitor tags on buses or street light service vehicles to enable users of a system incorporating the reader devices to monitor either or both buses or street light service vehicles.

With respect to an embodiment adapted for real-time location tracking, such an embodiment would provide battery-powered Bluetooth LE tags to be attached to assets to be tracked and each tag would be encoded with a unique string of data allocated to the asset. Alternatively, where existing RFID tags have already been deployed instead of battery-powered Bluetooth LE tags, a Bluetooth LE system can act as a bridge between previously deployed RFID tags and a mobile device in communication with the Bluetooth LE system.

A reader device can be integrated into transport vehicles to enable tracking of assets, for example throughout a delivery chain where an asset is transported from one location equipped with one or more reader devices using a transport vehicle equipped with a reader device and to a second location also equipped with a reader device.

The tags can be used to provide more than one functionality, for example both a location and a temperature reading, by alternating the wireless broadcast communication packets 1200 between functions. A further example would be to provide both an asset tracking function and a location function to enable advertising to be provided to passing mobile devices.

Alternatively, another embodiment provides the functionality of a tag on a mobile device loaded with "tag" software or a dedicated application. This allows mobile devices running the tag software or application provide UUIDs to other devices in range, for example over the Bluetooth LE protocol. The tag software can be integrated into third party apps or implemented as an application or software that can run as a foreground and/or background service. The UUID can be updated depending on the location of the mobile device running the tag software or application, for example based on the location services available to that mobile device such as GPS functionality.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A method of providing context-sensitive information to users of one or more respective recipient mobile devices comprising:
   transmitting from a tag attached to a moveable object or from a transmitting mobile device via a wireless protocol a unique identifier to the one or more recipient mobile devices;
   determining a measure of location of the respective recipient mobile device and/or tag or transmitting mobile device; and
   providing from a server information for display on the one or more recipient mobile devices based on both the unique identifier and the measure of location; wherein the tag or transmitting mobile device does not communicate with a telecommunications system over which the server provides the information;
   wherein the unique identifier changes over time in accordance with an algorithm used to encode the unique identifier at the tag or at the transmitting mobile device to incorporate a data payload or alternates between two or more algorithms used to encode the unique identifier at the tag or transmitting mobile device to incorporate said data payload; and
   the algorithm encodes the unique identifier differently each time the tag or transmitting mobile device transmits the encoded unique identifier, preferably wherein the algorithm encodes the unique identifier in response to a data source wherein the data source comprises at least one of sensor data; alert data; asset tracking data; status data; encryption; event data; external stimulus data or sequential portions of a sequence of data.

2. The method of claim 1 wherein the moveable object or transmitting mobile device is provided with a display and the unique identifier is associated with information shown on the display.

3. The method of claim 2 wherein the display is configured to change the information shown periodically and/or based on the location of the moveable object or transmitting mobile device; and
   the information for display on the one or more recipient mobile devices is selected to correspond to the information shown on the display on the moveable object or transmitting mobile device.

4. The method of any of claim 1 wherein one or more of said information for display on the one or more recipient mobile devices is provided from the server to the one or more recipient mobile devices in advance of the one or more recipient mobile devices receiving one or more said unique identifiers from one or more respective tags or transmitting mobile device; and the information for display is stored on the one or more recipient mobile devices.

5. The method of any of claim 1 wherein the determining the measure of location is performed by a location device on the moveable object or by the transmitting mobile device.

6. The method of any of claim 1 wherein the determining the measure of location is performed by functionality of the one or more recipient mobile devices.

7. The method of any of claim 1 wherein the determining the measure of location is performed by the server.

8. The method of any of claim 1 wherein the tag is a short range wireless transmitter such as a NFC, WiFi or Bluetooth module, tag or token or the transmitting mobile device comprises a short range wireless transmitter such as a NFC, WiFi or Bluetooth module; and the unique identifier is transmitted to the one or more recipient mobile devices in an initial communication phase of the wireless protocol of the short range wireless transmitter.

9. The method of any of claim 1 wherein the context-sensitive information comprises information associated with a predetermined location or range of locations and wherein the information comprises at least one or a combination of: text, images, HTML, a URL or executable code.

10. The method of any of claim 1 wherein the unique identifier changes over time in accordance with an algorithm used to encode the unique identifier at the tag and used to decode the unique identifier at either the one or more mobile devices or at the server.

11. The method of claim 1 wherein the server provides information for display on the one or more recipient mobile devices based on an application ID in addition to said unique identifier and said measure of location.

12. A system for providing context-sensitive information to users of one or more respective recipient mobile devices comprising:
   a tag or a transmitting mobile device, the tag being attached to a moveable object, the tag or transmitting mobile device configured to transmit via a wireless protocol a unique identifier to the one or more recipient mobile devices;
   a location detector configured to determine a measure of location of the one or more recipient mobile devices and/or tag or transmitting mobile device upon receipt of the unique identifier by the one or more recipient mobile devices; and
   a server configured to provide information for display on the one or more recipient mobile devices based on both the unique identifier and the measure of location in response to a query from one or more recipient mobile devices; wherein the tag or transmitting mobile device is not configured to communicate with a telecommunications system over which the server provides the information;
   wherein the unique identifier changes over time in accordance with an algorithm used to encode the unique identifier at the tag or at the transmitting mobile device to incorporate a data payload or alternates between two or more algorithms used to encode the unique identifier at the tag or transmitting mobile device to incorporate said data payload; and
   the algorithm encodes the unique identifier differently each time the tag or transmitting mobile device transmits the encoded unique identifier, preferably wherein the algorithm encodes the unique identifier in response to a data source wherein the data source comprises at least one of sensor data; alert data; asset tracking data; status data; encryption; event data; external stimulus data or sequential portions of a sequence of data.

13. A system for providing context-sensitive information to a mobile device, the system comprising:
- a wireless transmitter configured to transmit via a wireless protocol a unique identifier associated with the protocol, a server, and a mobile device configured to receive the unique identifier from the wireless transmitter and to transmit the unique identifier to the server to obtain context-sensitive information associated with the unique identifier from the server, wherein the wireless transmitter is configured to transmit only an initial phase of a wireless protocol, the initial phase comprising the unique identifier;
- wherein the mobile device does not interact with or use the wireless protocol beyond receiving the unique identifier from the initial phase of the wireless protocol.

14. The system of any one of claim 13, wherein the wireless transmitter is configured to additionally transmit a non-unique identifier, optionally also comprised in an initial phase of a wireless protocol.

15. The system of any one of claim 13, wherein the wireless transmitter is configured to broadcast the unique identifier, optionally either at intervals (optionally periodically) or continuously, or combinations thereof.

16. The system of any one of claim 13, wherein the server comprises and/or communicates with at least one database, the database containing an entry for each unique identifier and context-sensitive information associated therewith.

* * * * *